Figure 1:
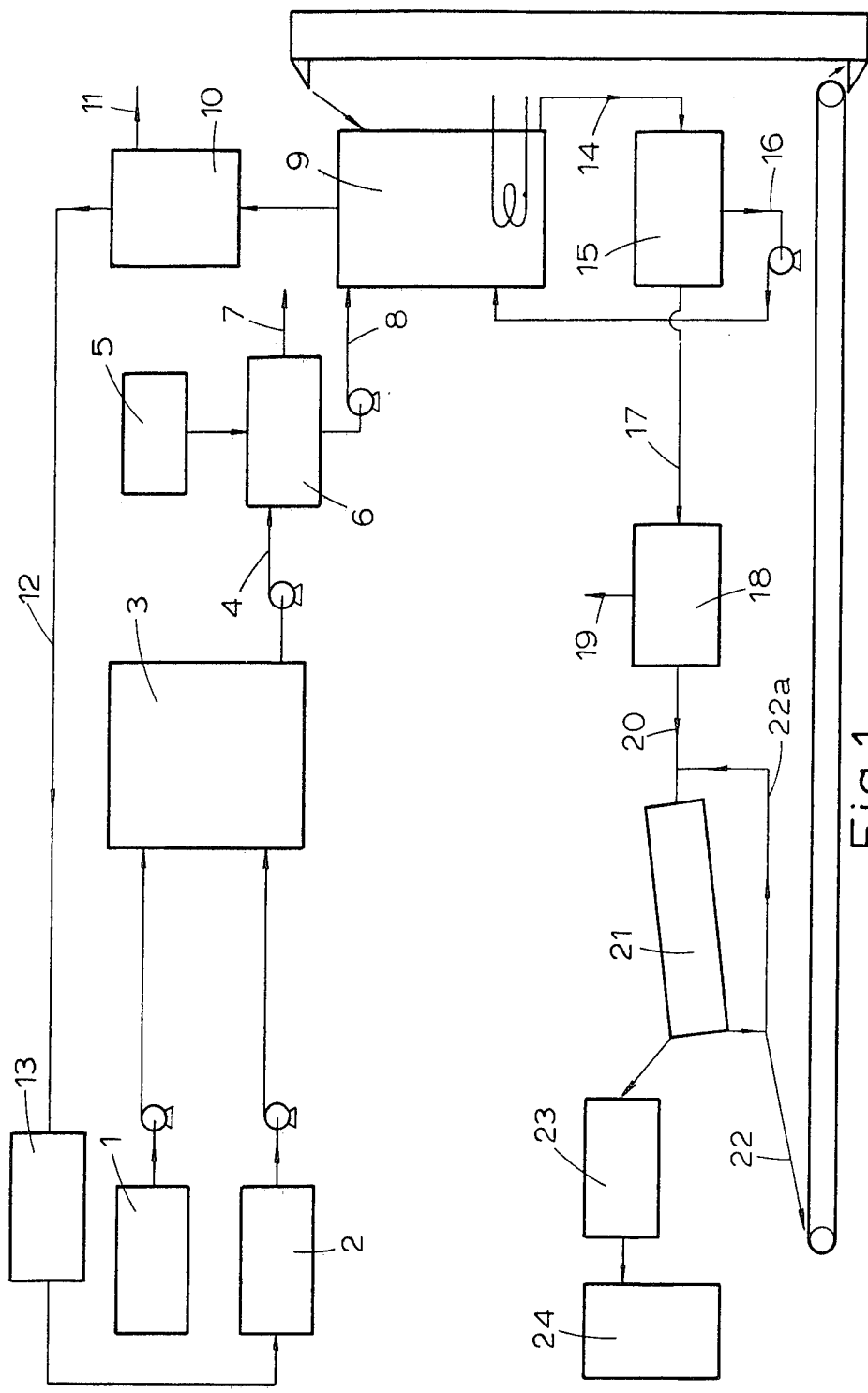

United States Patent [19]

Thompson et al.

[11] 4,089,936

[45] * May 16, 1978

[54] PRODUCTION OF HYDROGEN FLUORIDE

[75] Inventors: William Henry Thompson; Ralph Eric Worthington; David John Stamper, all of Dublin, Ireland

[73] Assignee: Goulding Chemicals Limited, Dublin, Ireland

[*] Notice: The portion of the term of this patent subsequent to Nov. 1, 1994, has been disclaimed.

[21] Appl. No.: 725,045

[22] Filed: Sep. 20, 1976

Related U.S. Application Data

[62] Division of Ser. No. 389,572, Aug. 20, 1973, Pat. No. 4,056,604.

[51] Int. Cl.$^2$ .................. C01B 7/22; C01D 3/02; C01D 3/00
[52] U.S. Cl. .................. 423/483; 423/472; 423/490
[58] Field of Search .................. 423/483, 472, 490

[56] References Cited

U.S. PATENT DOCUMENTS

| | | | |
|---|---|---|---|
| 1,581,819 | 4/1926 | Siegel | 423/490 |
| 2,588,786 | 3/1952 | Winter | 423/483 |
| 3,101,254 | 8/1963 | Cunningham | 423/483 |
| 3,157,469 | 11/1964 | Tufts | 423/483 |
| 3,195,979 | 7/1965 | Burkert et al. | 423/483 |
| 3,551,098 | 12/1970 | Flemmert | 423/483 X |
| 3,842,161 | 10/1974 | Hyoky | 423/490 X |
| 4,056,604 | 11/1977 | Thompson et al. | 423/490 X |

FOREIGN PATENT DOCUMENTS

| | | | |
|---|---|---|---|
| 1,010,504 | 6/1957 | Germany | 423/472 |

*Primary Examiner*—Edward Stern

[57] ABSTRACT

Ammonium fluoride is converted into a bifluoride by reaction with KF to form KF.HF, converting the latter to NaF.HF and heating said sodium bifluoride to form a solid product comprising NaF.

1 Claim, 4 Drawing Figures

PRODUCTION OF HYDROGEN FLUORIDE

This is a division of application Ser. No. 389,572, filed on Aug. 20, 1973 U.S. Pat. No. 4,056,604.

This invention relates to the production of hydrogen fluoride from hydrofluosilicic acid which is a by-product of the manufacture of phosphoric acid and superphosphates. More specifically, the fluorine is recovered from superphosphate den and phosphoric acid plant effluent gases.

The scrubber liquors from these plants contain hydrofluosilicic acid which can be made to react with ammonia as shown by the following well known reactions:

$$H_2SiF_6 + 6NH_3 + 2H_2O \rightarrow SiO_2 + 6NH_4F \quad (I)$$

The ammonia can be added to the liquors in liquid or gaseous form or in solution in water. Silica is precipitated as a solid and separated from the liquor. The liquors contain ammonium fluoride in solution which can be substantially converted to ammonium bifluoride by boiling. Complete conversion of the ammonium fluoride into ammonium bifluoride requires evaporation to dryness followed by a period of heating in excess of 120° C. We believe that the conversion in aqueous solution can be represented by the following reactions:

$$F^- + H_2O \rightleftharpoons HF + OH^- \quad (II)$$

$$NH_4^+ + OH^- \rightleftharpoons NH_3 + H_2O \quad (III)$$

$$F^- + HF \rightleftharpoons HF_2^- \quad (IV)$$

The reaction is complete when all the ammonium fluoride present has been converted to ammonium bifluoride.

We have found that the conversion of the fluoride to bifluoride is facilitated by the presence of fluoride ions supplied by a soluble metal fluoride such as potassium fluoride. In particular, we have found that solutions of ammonium fluoride on boiling with excess potassium fluoride give quantitative yields of potassium bifluoride with substantially complete removal of ammonia as a gas.

According to our invention, therefore, we provide a process for the hydrolysis of ammonium fluoride to ammonia and hydrogen fluoride in which the ammonium fluoride is heated in solution in the presence of an excess of a soluble metal fluoride which is capable of reaction with the hydrogen fluoride produced to form a bifluoride which can be isolated substantially free from ammonia and is decomposable by heating to release hydrogen fluoride allowing the metal fluoride to be returned to the process.

In a preferred embodiment, the soluble fluoride is potassium fluoride.

We believe that the bifluoride ions produced during the course of the hydrolysis of the ammonium fluoride in aqueous solution according to reaction II and IV inclusive retard the conversion of further fluoride ions into bifluoride ions. This retardation effect of the bifluoride ions is counteracted by maintaining a high level of fluoride ions relative to ammonium ions and by maintaining a fluoride ion concentration at least equal to the bifluoride ion concentration in the solution.

We have found in accordance with our invention that it is possible to effect rapid and essentially quantitative conversion of ammonium fluoride to ammonia and hydrogen fluoride in the presence of substantial amounts of bifluoride ions provided that there is an excess fluoride as compared with ammonium ions.

The weight ratio of fluoride ions to ammonium ions in solution is generally greater than 2.5:1 and is preferably greater than 3:1. It is particularly preferred that the ratio should be greater than 4:1. The upper limit of the level of fluoride ions in solution is governed by the solubility of the fluoride salts present. In practice, the upper limit is not normally above 10:1. In general, the working range is a weight ratio of fluoride ions to ammonium ions of from 3 to 8 to 1.

The use of the high fluoride ion concentration in accordance with the invention has inter alia the following features:

(a) It greatly accelerates the decomposition of ammonium fluoride into ammonia and hydrogen fluoride.

(b) The hydrogen fluoride formed reacts with fluoride ions which are present in high concentrations to form bifluoride ions. As a consequence, hydrogen fluoride losses in the vapours evolved from the reactor are insignificant (c) The high solubilities of potassium fluoride and ammonium fluoride in water enable the reaction conditions to be chosen so that the bifluoride ions produced are substantially recoverable as a mixture of potassium bifluoride and potassium fluoride. The conditions may be so chosen as to yield solids varying in potassium bifluoride content within the range of from 95% to 35%.

Both the weight ratio of potassium fluoride to potassium bifluoride in solution and the filtration temperature employed governs the relative amounts of KF and $KHF_2$ in the crystallised solids. At filtration temperatures ranging from ambient to 60° C., the recovered solid contains ≧ 70% potassium bifluoride for a weight ratio range of $KF/KHF_2$ from 0.4 to 2.9. When employing filtration temperatures of greater than 60° C., and especially at 100° C. and higher, the weight ratio of KF : $KHF_2$ in solution should generally be maintained within the range from 0.7 to 1.5. Thus, we have found that the $KHF_2$ content of the recovered solids decreases with both increasing KF : $KHF_2$ ratio in the solution and increasing filtration temperature, the effect of increasing filtration temperature becoming most marked in the temperature range from 80° C. up to the boiling point of the solution.

It is therefore possible by suitably adjusting the KF : $KHF_2$ ratio in solution and the filtration temperature to recover solids ranging widely in $KHF_2$ content, e.g. from 95% to 35%.

The presence of a substantial amount of KF in the recovered solids can be advantageous in the operation of the final stage of the process as shown below in connection with specific embodiments of the invention, where there is a direct decomposition of the potassium bifluoride solids. In particular, the presence of KF minimises the melting of the solids in the kiln. In another embodiment of the invention it is preferable to operate with high bifluoride levels in the filtered solids as will be seen below in the specific description of the process. In any event, it is preferable to crystallise and to remove the solids at a temperature in excess of 60° C. in order to obtain the co-crystallised potassium fluoride in the anhydrous form, so permitting the solids to be more easily dried. A further advantage of filtering at a temperature is excess of 60° C. is that the ammonium fluoride content of the solids is substantially reduced compared to the solids obtained from the same solution at ambient temperature. In order to ensure a minimal ammonium fluoride content in the recovered solids (viz. less than 0.1%), the weight ratios of both KF and $KHF_2$ relative to ammonium fluoride should be maintained at 2:1 or greater.

The reaction of ammonium fluoride with potassium fluoride in aqueous solution occurs at significant rates at temperatures above 30° C. At lower temperatures, the reaction is slow. In the process as described, it is necessary to remove water continuously from the system. There is therefore a preference for carrying out the reaction at the boiling point. We can, however, work in practice at temperatures of from 70° up to the boiling point of the solution which is generally between 120° and 130° C. The crystallised solids may be removed by cooling the hot reactor outflow to a suitable temperature, filtering and returning the filtrate to the reactor.

Alkali metal bifluorides lose hydrofluoric acid on heating to elevated temperatures. Potassium bifluoride is quantitatively decomposed at temperatures in excess of 400° C. Sodium bifluoride is decomposed at temperatures in excess of 250° C. It is therefore a preferred embodiment of our process to convert the potassium bifluoride to sodium bifluoride by reaction with sodium fluoride, before decomposition to hydrogen fluoride. The sodium fluoride produced is recycled to the process. The exchange reaction may be carried out by slurrying a concentrated solution of potassium bifluoride with powdered sodium fluoride. Alternatively, in order to achieve an economy in water usage, the exchange reaction may be carried out in the liquors coming from the ammoniator.

Hydrofluosilicic acid recovered by scrubbing the off-gases of phosphate plants generally has a $P_2O_5$ content in the range 0.1 to 3.0% due to carry-over of entrained phosphoric acid droplets and rock phosphate dust. While there are commercial processes available to reduce the $P_2O_5$ level of the hydrofluosilicic acid to as low as 0.01%, we prefer to prevent the build up of the phosphate level in the system by treatment of a portion of the recycle stream from the main reactor with zinc oxide, the $P_2O_5$ precipitating as zinc ammonium phosphate and being removed by filtration. Alternatively, ammonia under pressure may be used.

The process of the invention may also be modified to produce calcium fluoride from the hydrofluosilicic acid. Calcium fluoride is a preferred raw material for the production of hydrofluoric acid; other fields of use include the steel and glass industries.

The modification comprises the following features:
(i) the reaction of ammonium fluoride with excess potassium fluoride in a first reactor; and
(ii) the reaction of the liquor from the first reactor with calcium carbonate in a second reactor, followed by the removal of the calcium fluoride and the recycling of the filtrate (essentially a concentrated solution of potassium fluoride) to the first reactor.

The presence of large proportions of alkali metal fluoride, e.g. potassium fluoride, with the bifluoride mass minimises melting and reduces sintering during decomposition in the kiln. As described above, the KF content of the reactor product solids can be adjusted by varying the ratio of $KHF_2$ to KF in the reactor solution and the filtration temperature. Solids containing a substantial amount of either sodium fluoride or lithium fluoride may be employed during the decomposition in the kiln, both these salts being present in the system largely as undissolved solids. After decomposition, the mass containing potassium fluoride together with sodium or lithium fluoride can be recycled to the reaction vessel for re-use in the process.

If desired, the potassium fluoride may be separated from the sodium or lithium fluoride in the mass by leaching with water. The dissolved potassium fluoride may be returned to the reactor and the residual solid, which comprises sodium or lithium fluoride may be sent to the dryer where it may be mixed with the reactor product solids.

Figure 2:
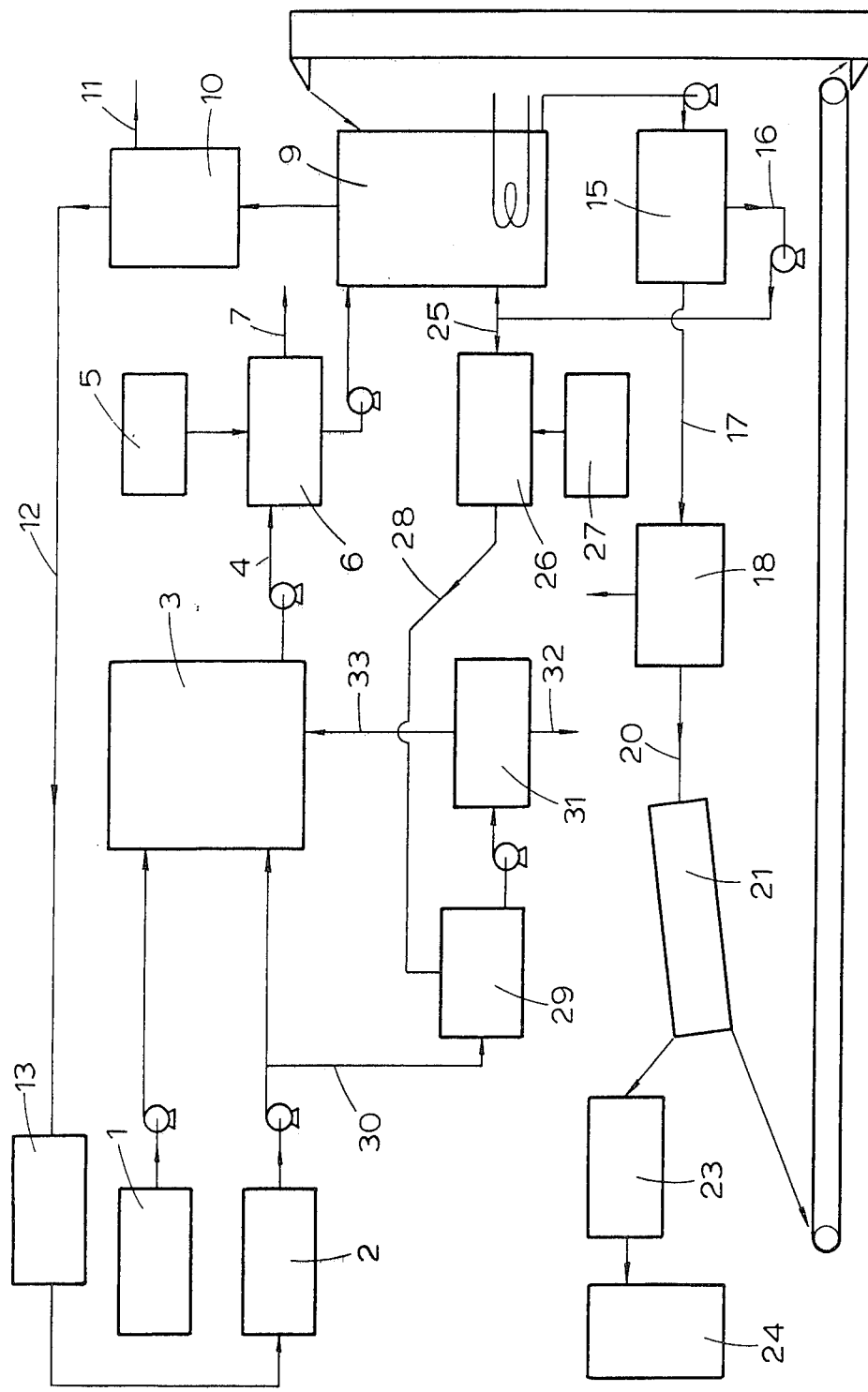

For a better understanding of the invention reference is now made to the accompanying drawings, in which:

FIG. 1 is a flow sheet of one embodiment of the process according to the invention for the recovery of hydrogen fluoride from hydrofluosilicic acid; and FIGS. 2 and 5 are flow-sheets of modifications of this process.

The apparatus diagrammatically indicated in FIG. 1 comprises a source 1 of hydrofluosilicic acid and a source 2 of ammonia, followed by an ammoniator 3, a silica filter 6, a reactor 9, and an ammoniator stripper 10.

A crystalliser/filter 15 is followed by a drier 18, a kiln 21 for the removal of hydrofluoric acid purification, a system 23 and a storage tank 24 for the purified hydrofluoric acid.

The apparatus may be operated as follows.

Hydrofluosilicic acic and ammonia are reacted in the ammoniator 3 and the resulting aqueous ammoniacal slurry is fed through the conduit 4 to the filter 6. The separated solid silica is washed with water supplied at 5 and removed from the system at 7.

The collected filtrate 8 which consists essentially of an aqueous ammoniacal solution of ammonium fluoride, is fed to the reactor 9 together with recycled filtrate 16 from the filter 15 and recycled potassium fluoride 22 from the kiln 21. Water vapour and ammonia are removed from the reactor 9 by maintaining the contents of the reactor at the boiling point of the solution, i.e. approximately 125° C. The water-vapour ammonia mixture is separated in the ammonia stripper 10, the gaseous ammonia being fed along the conduit 12 to the compressor 13 and thence to the ammonia storage vessel 2. The water is carried via the conduit 11 back to the scrubbing system. The rate of boiling in the reactor 9 is adjusted so that the rate of removal of the water vapour is essentially equal to the rate of the addition of water to the reactor 9 in the stream 8.

The outflow from the reactor 9 passes through the conduit 14 into the crystalliser/filter 15, the solid 17 being filtered off and then dried in the drier 18. As mentioned above, the filtrate is returned to the reactor via the conduit 16. The water removed from the solid 17 in the drier 18 is vented to the scrubber via the conduit 19.

The dry solid 20 is fed into the kiln 21 and hydrofluoric acid is passed through the purification system 23, and pure hydrofluoric acid is collected at 24. The residue of potassium fluoride in the kiln is recycled to the reactor via the conveyor system 22. Part is recycled to the kiln as shown at 22a.

Some or all of the liquor obtained in the scrubber system may be used as a scrubbing liquor for the recovery of hydrofluosilicic acid from effluent gases obtained from a phosphoric acid plant or superphosphate den. As the liquor contains some ammonia, some of the recovered hydrofluosilicic acid is converted to ammonium fluosilicate.

According to a further embodiment of the process, the concentration of ammonium fluoride in the stream 7 which is fed to the reactor 22 may be increased by recovering some or all of the hydrofluosilicic acid from effluent gases from a phosphoric acid plant or a superphosphate den in the form of ammonium fluosilicate by introducing ammonia into the hydrofluosilicic acid scrubbing water. This may be achieved by using some or all of the liquor from the scrubbing system in the hydrofluosilicic acid recovery system or by adding ammonia directly to the hydrofluosilicic acid recovery system or by any combination of these two possibilities.

PHOSPHATE REMOVAL

Figure 3:
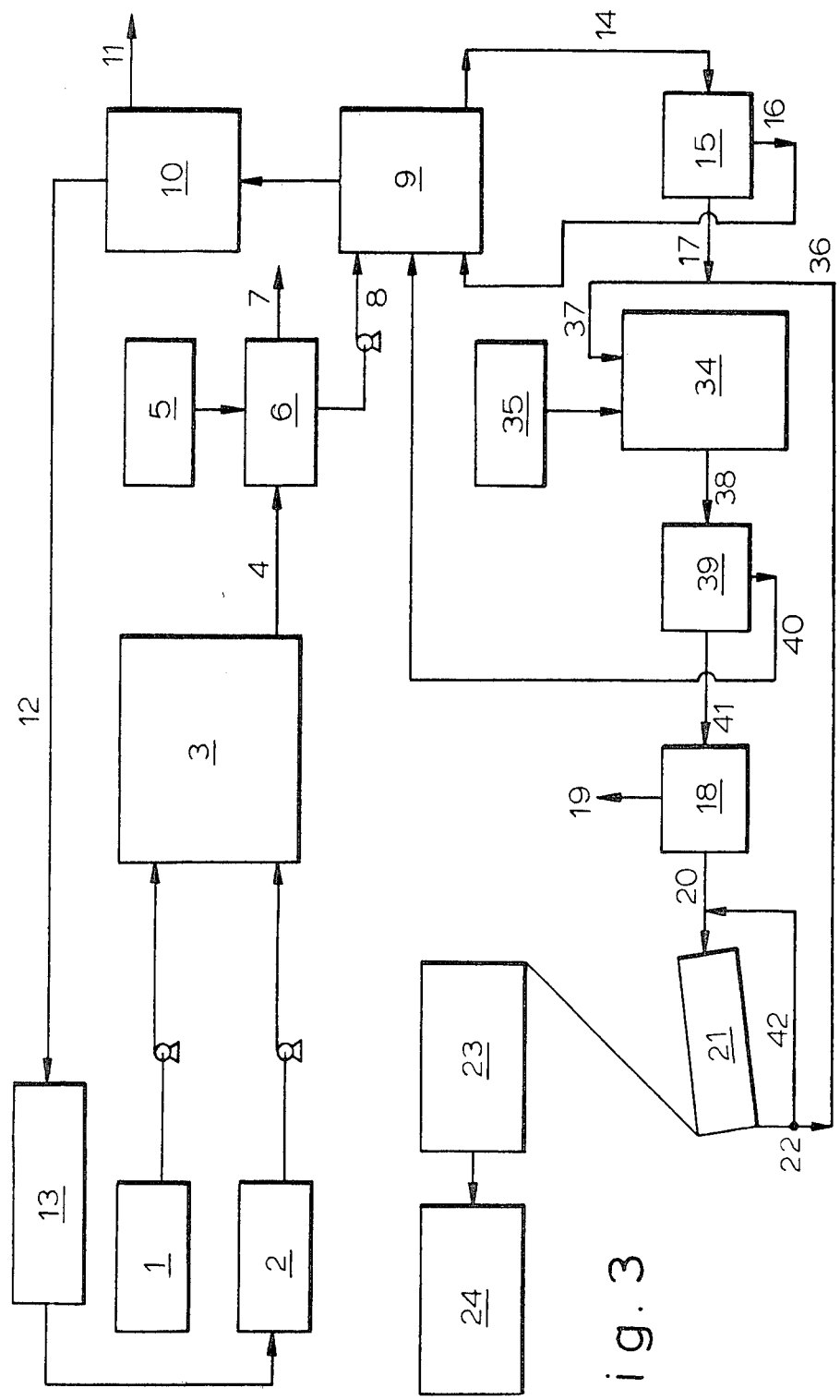

Schemes for preventing a build-up of $P_2O_5$ in the system are shown in FIGS. 2 and 3. The apparatus for preventing $P_2O_5$ build-up using zinc oxide and ammonia is shown diagrammatically in FIG. 2. A portion of the recycle stream 16 is bled off through a conduit 25 to a cooler 26. Sufficient water is added via a conduit 27 to ensure that a homogeneous solution is maintained at 60° C. After dilution and cooling to 60° C., the solution is passed through a conduit 28 to a reactor 29. Liquid ammonia is added through a conduit 34 until the pH reaches 8.5 to 9.0. Zinc oxide is added at 30 and the slurry is stirred for one hour at 60° C. The slurry is passed on to the filter 31 and zinc ammonium phosphate is removed at 32. The filtrate is passed through a conduit 33 to the ammoniator.

The apparatus for removing $P_2O_5$ from the system using ammonia under pressure is shown in FIG. 3. A portion of the recycle stream 16 is bled off through the conduit 25 and mixed with sufficient water in the cooler 26 to form a homogeneous solution at 30° – 40° C. The homogeneous solution is passed via the conduit 28 to the pressure vessel 29 and liquid ammonia is added via the conduit 30 to give a pressure of about 4 atmospheres. The tri-ammonium phosphate obtained on the filter 31 is removed at 32 and the filtrate is passed through a conduit 33 to the ammoniator.

Instead of the direct decomposition of $KHF_2$ into KF + HF, the $KHF_2$ may be converted into $NaHF_2$ using NaF.

The sodium bifluoride is then decomposed at a lower temperature than is possible with potassium bifluoride. This scheme is shown diagrammatically in FIG. 4. The $KHF_2$ cake is not sent to the kiln but is reacted with a slurry of NaF in water in the Reactor 11. The $NaHF_2$ is removed on the Filter III, dried and decomposed into NaF and HF, the NaF being returned to the Reactor II. The filtrate from the Filter III (comprising essentially of a solution of K in water) is fed into the Reactor I for the conventional hydrolysis of $NH_4F$ in the presence of excess KF described previously.

The less conventional method of dissolving the $KHF_2$ cake in the ammonium fluoride liquors from the ammoniator and reacting with NaF to yield solid $NaHF_2$ and KF (in solution) has the advantage that less water has to be removed from the system by evaporation but yields a solid product containing a significant amount of residual $KHF_2$, and hence is less susceptible to quantitative thermal decomposition at temperatures around 300° C.

FIG. 4A of the drawings is a fragmentary flow sheet showing a modification of the decomposition stage. Air or other inert gas is blown or sucked into the kiln and the outflow is passed to a water absorber. The resulting aqueous solution of HF is fed to an HF recovery vessel in which concentrated $H_2SO_4$ is used to liberate HF, the diluted $H_2SO_4$ being also recovered and optionally concentrated and re-used.

Reference is now made to FIG. 5 which is a flowsheet of an embodiment of the process of the invention in which calcium fluoride is produced.

The illustrated apparatus comprises a source 1 of hydrofluosilicic acid and an ammonia storage vessel 2 followed by an ammoniator 3, a silica separator 4, reactors 7a and 7b, an ammonia stripper 8 and a $CO_2$ recovery unit 14. The reactor 7b has a feed source of calcium carbonate 13, and is followed by a calcium fluoride separator 16, a dryer 19 and a storage bin 22.

The apparatus may be operated as follows: Hydrofluosilicic acid and ammonia are reacted in the ammoniator 3 and the resulting solid silica is separated off in the separator 4 and removed from the system at 5. The filtrate 6 consisting mainly of an aqueous solution of ammonium fluoride is reacted with excess potassium fluoride in the first reactor 7a. The mixture of ammonia and water vapour evolved from reactor 7a is separated in the ammonia stripper 8, the gaseous ammonia being liquefied by the compressor 10 and returned to the ammonia storage vessel 2. The liquor from the reactor 7a is passed via conduit 12 into the second reactor 7b and reacted with powdered calcium carbonate from the feed source 13. The evolved carbon dioxide and water vapour are removed from the system at 14. The reactor product 15 is fed to the separator 16 from which moist calcium fluoride 17 passes to the drier 19. The filtrate 18, essentially a concentrated solution of potassium fluoride, is returned to the reactor 7a. The water 20 removed from the moist calcium fluoride in the drier 19 is fed to the scrubbing system. The dried calcium fluoride 21 is then conveyed to the storage bin 22.

This modification allows calcium fluoride of "metallurgical" or "ceramic" grade to be prepared. The use of an excess of potassium bifluoride shortens the reaction time and ensures a minimum calcium carbonate content.

The invention is illustrated by the following experiments and examples in which all the quantities given are by weight unless otherwise stated.

EXPERIMENT 1

This experiment illustrates the effect of increasing fluoride ion concentration upon the initial rate of hydrolysis of ammonium fluoride in aqueous solution at the boiling point.

The acceleration produced upon the hydrolysis of ammonium fluoride in aqueous solution by increasing the fluoride ion concentration is illustrated below. Variations in the total fluoride ion concentration were effected by the addition of anhydrous potassium fluoride.

The reaction mixtures were prepared by adding the required amounts of anhydrous potassium fluoride to 50 ml of approximately 7 molar ammonium fluoride solution, diluting to 100 ml with water and reacting at the boiling point for the required length of time. Water was added as required to maintain the volume of reacting solution at about 100 ml.

The extent of reaction was followed both by titration of aliquots of the reaction mixture with standard alkali and by monitoring the ammonium ion concentration in the solutions. Good agreement was obtained between the two methods.

Typical results are shown below.

Sample A: no KF added; Initial $F^-/NH_4^+$ ratio = 1.0
Sample B: 21.0 g KF added; Initial $F^-/NH_4^+$ ratio = 2.0
Sample C: 42.0 g KF added; Initial $F^-/NH_4^+$ ratio = 3.0
Sample D: 63.0 g KF added; Initial $F^-/NH_4^+$ ratio = 4.0

| Sample | % $NH_4F$ decomposed after | | | | |
|---|---|---|---|---|---|
| | 5 | 10 | 15 | 30 | 60 minutes |
| A | 7.1 | 10.6 | 11.9 | 15.0 | 19.9 |
| B | 13.8 | 20.4 | 29.1 | 44.3 | 50.7 |
| C | 22.5 | 44.0 | 58.8 | 74.2 | 83.4 |
| D | 40.5 | 52.7 | 81.1 | 90.6 | 97.8 |

EXPERIMENT 2

This experiment illustrates the effect of initial $F^-/NH_4^+$ ratio upon the limiting conversion of ammonium fluoride into ammonia and hydrogen fluoride in aqueous solution.

Samples A, B and D described in Example A were reacted at the boiling point until the rate of the reaction dropped to an insignificant level (viz. no detectable increase in the extent of conversion of the ammonium fluoride during a time interval of 15 minutes).

| Sample | Initial $F^-/NH_4^+$ ratio | % Decomposition of $NH_4F$ at limiting conversion |
|---|---|---|
| A | 1.0 | 35 |
| B | 2.0 | 66 |
| D | 4.0 | >98 |

EXPERIMENT 3

This experiment illustrates the retarding effect of bifluoride ions on the rate of decomposition of ammonium fluoride in aqueous solution.

The effect of the addition of potassium bifluoride to Sample D (0.66 moles $KHF_2$ per mole of anhydrous potassium fluoride) has confirmed that $HF_2^-$ ions (which are formed during the decomposition of the ammonium fluoride) retard the rate of reaction but most probably do not substantially affect the limiting conversion.

| Sample | % decomposition of $NH_4F$ after | | | |
|---|---|---|---|---|
| | 10 | 15 | 30 | 60 minutes |
| D | 52.7 | 81.1 | 90.6 | 97.8 |
| D + $KHF_2$ | 32.3 | 52.6 | 71.8 | 88.5 |

There now follow specific examples of the invention in which the apparatus shown in the drawings was used.

EXAMPLE I

The apparatus of FIG. 1 was used. 1000 parts by weight of aqueous fluosilicic acid (16% $H_2SiF_6$) were reacted with gaseous ammonia until a pH of 9 was reached. The silica which precipitated was removed by filtration and washed twice with water (2 × 75 parts). The filtrate of ammonium fluoride solution (1190 parts containing 20.5% by weight of ammonium fluoride) was fed to a reactor and 855 parts of water and 1150 parts of anhydrous potassium fluoride were added. The reaction mixture was heated to boiling point, the reate of heating being adjusted so as to evaporate off an amount of water substantially equivalent to that added in the ammonium fluoride stream in one hour. Gaseous ammonia was rapidly evolved from the boiling reaction mixture, and after separation from the water vapour concurrently being removed from the reaction mixture, it was used to ammoniate a further batch of hydrofluosilicic acid.

After a reaction time of one hour, the reaction mixture was cooled to 20° C. causing a white crystalline solid to separate out. The solid was removed by filtration and then dried at 150° C. Analysis showed the solid to consist of 87.5% by weight of potassium bifluoride, 12.0% by weight of potassium fluoride and less than 0.02% by weight of ammonium fluoride. The filtrate (1570 parts) containing 714 parts of potassium fluoride, 41 parts of potassium bifluoride and 5 parts of ammonium fluoride, was recycled to the reactor.

The dry solid (520 parts) was decomposed in a kiln at 400° C. to yield anhydrous potassium fluoride (403 parts) and anhydrous hydrogen fluoride (117 parts). The anhydrous potassium fluoride was recycled to the reactor.

EXAMPLE II

This was as in Example I but the addition of 855 parts water to the reactor was replaced by recycled filtrate, and the addition of 1150 parts anhydrous potassium fluoride was replaced by recycled anhydrous potassium fluoride.

After drying at 150° C., 596 parts of crystalline solid were obtained consisting of 81.3% by weight of potassium bifluoride, 18.0% by weight of potassium fluoride and less than 0.02% by weight of ammonium fluoride. After removal of the crystalline solid by filtration, the filtrate (1450 parts), containing 645 parts potassium fluoride, 44 parts potassium bifluoride and 15 parts ammonium fluoride was recycled to the reactor.

Decomposition of the crystalline solid in a kiln at 400° C. produced 124 parts of anhydrous hydrogen fluoride and 472 parts of anhydrous potassium fluoride. The potassium fluoride was recycled from the kiln to the reactor.

EXAMPLE III

This was as in Example I but the water added to the reactor was reduced to 475 parts.

After a reaction time of one hour, the contents of the reactor were cooled to 70° C., and the crystalline solid which formed was removed by filtration. 477 parts of solid, consisting of 68.5% of potassium bifluoride, 31.2% potassium fluoride and less than 0.02% ammonium fluoride, were obtained after drying at 150° C. The filtrate (1277 parts), containing 636 parts potassium fluoride, 163 parts potassium bifluoride and 3 parts ammonium fluoride was recycled back to the reactor.

The dry solid was decomposed in a kiln at 400° C. to yield 83 parts of anhydrous hydrogen fluoride, the residue of anhydrous potassium fluoride being recycled back to the reactor.

EXAMPLE IV

The apparatus of FIG. 1 was again used. An aqueous ammonium fluoride solution prepared as described in Example 1 was fed continuously into an 8 liter reactor together with recycled filtrate and anhydrous potassium fluoride recycled from the kiln. The contents of the reactor were maintained at the boiling point, the rate of heating being such that water was removed from the system at the same rate as it was being added in the ammonium fluoride system. The ammonia evolved from the reactor was recovered and used to ammoniate a further batch of hydrofluosilicic acid.

In the reaction mixture, the weight percentage of fluoride ion relative to ammonium ions was maintained at substantially 4:1 and that of fluoride ions relative to bifluoride ions was maintained at substantially 1.5:1. This was done by adjusting the rates of addition of the ammonium fluoride solution and the filtrate recycle. Suitable rates of addition found in practice to be 5.2 and 6.4 liters per hour, respectively.

A crystalline solid analysing at substantially 80% potassium bifluoride was recovered at a rate of 3.03 kilogrammes per hour by cooling the outflow from the reactor to 70° C., filtering and finally drying the solid at 150° C. The filtrate was recycled continuously to the reactor. After drying, the crystalline product was decomposed in a kiln at 400° C. to yield anhydrous hydrogen fluoride (0.60 kilogrammes per hour) and potassium fluoride, the potassium fluoride being recycled continuously to the reactor.

EXAMPLE V

Figure 4:
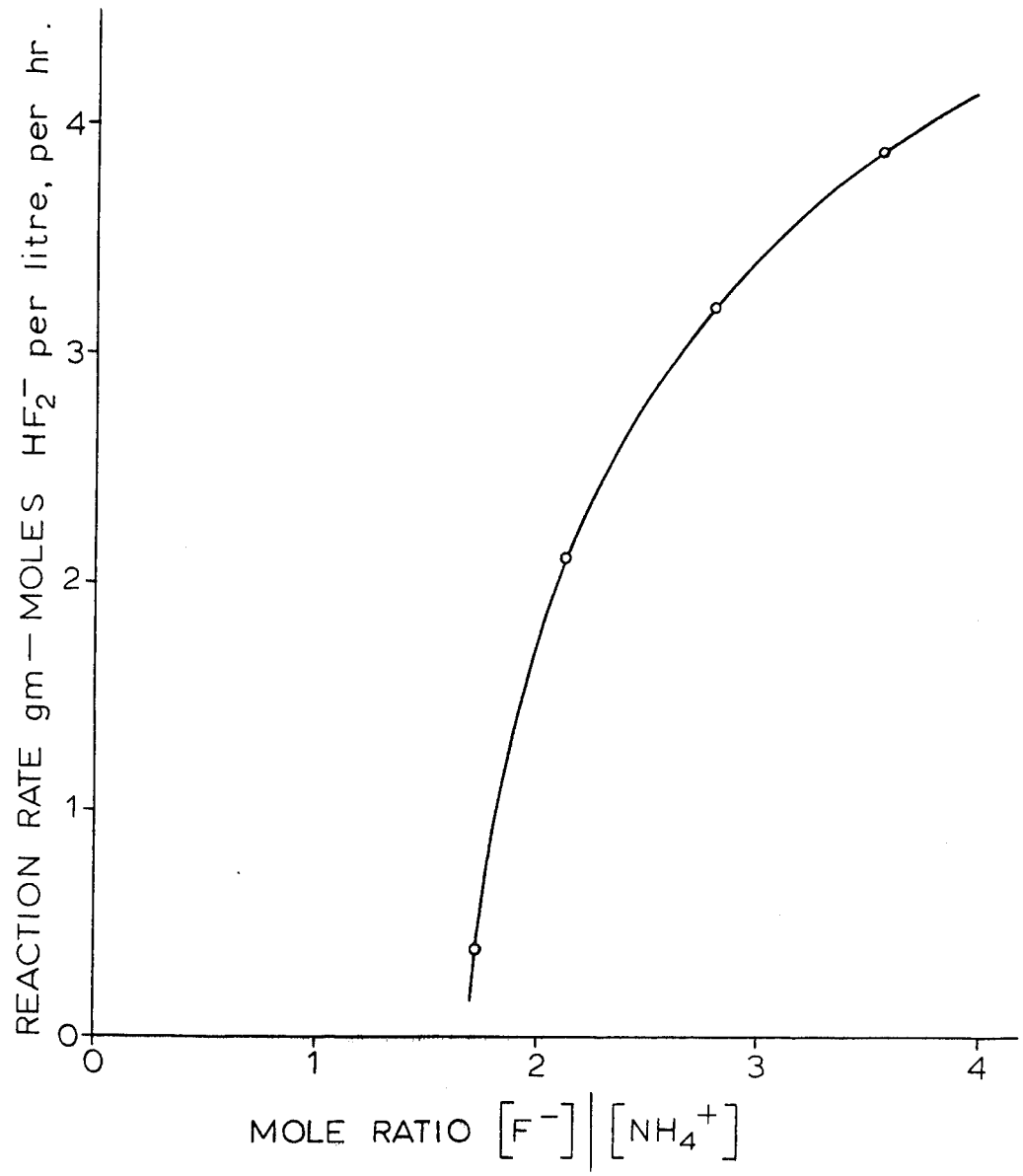

The apparatus of FIG. 4 was used. Solid product (100 parts containing 85.3% $KHF_2$) was recovered from the outflow from the reactor 1 on the filter 11 in accordance with Example I above and passed into the reactor 11 (the Sodium Exchange Vessel) together with 90 parts of water. The contents of the reactor 11 were brought to a temperature of 45° C. and 57.5 parts of parts of powdered sodium fluoride were added. The resulting slurry was stirred vigorously at a temperature of 45° C. for one hour and then filtered on the filter 111.

The recovered solid was dried under a vacuum at 120° C for two hours, the water vapour evolved (8 parts) being vented to the scrubber. Analaysis showed the dry solid to contain 70.0% $NaHF_2$, the remainder being substantially unreacted NaF. The filtrate (170 parts), containing 58 parts KF, 27 parts $KHF_2$ and 4 parts NaF, was recycled to the reactor 1.

The dry solid (70.3 parts) was decomposed in a kiln at 300° C. to yield 15.5 parts of anhydrous hydrogen fluoride. The residue in the kiln (54.8 parts) was recycled to the reactor 11.

EXAMPLE VI

This was in accordance with the apparatus of FIG. 5. 100 parts of aqueous hydrofluosilicic acid of about 16% by weight concentration were reacted with gaseous ammonia until a pH of 9 was reached. The precipitate of hydrated silica was removed by filtration, washed twice with water (2 × 7 parts) and the filtrate of ammonium fluoride solution (120 parts containing about 20% by weight of ammonium fluoride) was fed into a first reactor (reactor 7a) together with 85 parts of water and 115 parts of anhydrous potassium fluoride. The mixture was boiled for one hour, the rate of heating being so adjusted as to evaporate in one hour an amount of water substantially equivalent to that added in the ammonium fluoride stream. Gaseous ammonia was rapidly evolved from the boiling reaction mixture and, after separation from the water vapour concurrently being removed from the reaction mixture, it was used to ammoniate a further batch of hydrofluosilicic acid.

After a reaction time of one hour, the contents of this first reactor, consisting primarily of a concentrated aqueous solution of potassium fluoride and potassium bifluoride in an approximate molar ratio of 2:1, respectively, were run into a second reactor (reactor 7b in FIG. 5). Powdered calcium carbonate (29.2 parts) was added and the contents of this second reactor were maintained at 90° C. for 1 hour with vigorous stirring. Carbon dioxide and water vapour were evolved from the reactor, the water losses being continuously replaced as required.

After 1 hour at 90° C., the slurry from this second reactor was filtered at a temperature of 80° C. and the solid products was washed with water (2 × 10 parts). After drying for 2 hours at 150° C., the solid product (22.2 parts) was analysed and found to contain substantially 98.5% calcium fluoride and less than 1% residual calcium carbonate.

The filtrate and washings were recycled to the first reactor (reactor 7a in FIG. 5) to react with the next batch of ammonium fluoride solution.

We claim:

1. A process for the preparation of hydrogen fluoride, the process comprising heating ammonium fluoride in aqueous solution, in the presence of an amount of a soluble potassium fluoride in excess of the stoichiometric amount for reacting to form an aqueous solution of the bifluoride of the potassium, such that the weight ratio of fluoride ion to ammonium ion in solution is greater than 2.5 : 1, whereby the rate of reaction to form the bifluoride is increased, and recovering a solid product comprising potassium bifluoride from the solution substantially free from ammonia, reacting at least a portion of the potassium bifluoride with sodium fluoride to form sodium bifluoride, and decomposing the sodium bifluoride by heating to release hydrogen fluoride and to form a solid product comprising sodium fluoride.

* * * * *